United States Patent [19]

Matsumoto et al.

[11] 4,232,640
[45] Nov. 11, 1980

[54] INDUCTION SYSTEM FOR AN INTERNAL COMBUSTION ENGINE

[75] Inventors: Hiromitsu Matsumoto, Hamamatsu; Keiichi Sugiyama, Shizuoka, both of Japan

[73] Assignee: Yamaha Hatsukoko Kabushiki Kaisha, Iwata, Japan

[21] Appl. No.: 959,442

[22] Filed: Nov. 13, 1978

[30] Foreign Application Priority Data

Nov. 22, 1977 [JP] Japan .................. 52/140364

[51] Int. Cl.³ .................. F02B 17/00; F02B 3/00
[52] U.S. Cl. .................. 123/308; 123/336; 261/65; 261/23 A
[58] Field of Search .............. 123/122 AB, 122 AC, 123/32 ST, 32 SP, 103 R, 3, 127, 119 D, 124 R, 75 B; 261/23 A, 65 R, 39 A

[56] References Cited

U.S. PATENT DOCUMENTS

| | | | |
|---|---|---|---|
| 1,231,886 | 7/1917 | Hindrix | 261/65 |
| 1,799,426 | 4/1931 | Lang | 261/65 |
| 3,543,736 | 12/1970 | Suzuki | 123/32 ST |
| 4,086,885 | 5/1978 | Noguchi | 123/3 |

FOREIGN PATENT DOCUMENTS

2617728  5/1977  Fed. Rep. of Germany .......... 123/127

Primary Examiner—Ronald H. Lazarus
Attorney, Agent, or Firm—Ernest A. Beutler

[57] ABSTRACT

Several embodiments of internal combustion engines having relatively large main induction passages and relatively small auxiliary induction passages for delivering a charge to the chambers of the engine. Valve means control the proportion of flow to the chambers through the respective passages so that the low and medium charge requirements are supplied primarily by the auxiliary induction passage. This causes improved turbulance in the chamber at the time of combustion and promotes smooth running, good fuel economy and reduction in unwanted exhaust gas constituents. In conjunction with one feature of the invention, means are provided for accelerating the rate of valve movement during the transition from mixture supply from the auxiliary to the main induction passages to improve performance. In accordance with another feature of the invention, an arrangement is provided for permitting compact placement of the control valves.

9 Claims, 16 Drawing Figures

FIG. 15

INDUCTION SYSTEM FOR AN INTERNAL COMBUSTION ENGINE

BACKGROUND OF THE INVENTION

This invention relates to an induction system for an internal combustion engine and more particularly to an improved method and structure for controlling the engine induction.

Internal combustion engines, particularly those used in automotive applications, are called upon to run over a wide variety of speed and load ranges. As a result, many features in the engine design, particularly the induction and fuel feed system, require compromise to suit all load and speed conditions. As a result, low speed performance normally requires sacrifice of either fuel economy or smoothness of running or both. To offset these disadvantages, it has been proposed to provide an induction system employing a relatively large main induction passage and a relatively small auxiliary induction passage. The flow through these passages to the combustion chambers is controlled in such a way that substantially all of the low and partial load charge requirements are delivered to the chamber through the relatively smaller auxiliary induction passage. This permits the establishment of high turbulence in the chamber at the time of combustion to improve flame propogation and combustion. This is accomplished without the sacrifice of maximum power output and volumetric efficiency due to the use of the large main induction passage.

In accordance with this principle, it has been found that it is extremely important to accurately control the transition point at which flow transfers from the auxiliary to the main induction passage. It is, therefore, a first object of this invention to provide an improved flow control arrangement for an engine having a split induction system.

It is another object of the invention to provide an improved throttle control arrangement for an internal combustion engine having main and auxiliary induction passages.

In accordance with standard throttle valve arrangements, the use of two throttle valves in a given passage considerably increases the spacial requirements of the induction system. It is, therefore, a further principle object of the invention to provide an improved compact throttle valve arrangement.

It is a yet further object of the invention to provide a throttle valve system in which two butterfly-type throttle valves may be compactly positioned in a given conduit.

SUMMARY OF THE INVENTION

A first feature of the invention is adapted to be embodied in an internal combustion engine having variable volume chambers in which combustion occurs and main and auxiliary intake passages communicating with the chambers for delivering a charge thereto. The auxiliary induction passage has a substantially smaller effective cross-sectional area than the main induction passage so that a given mass flow of charge delivered to the chamber through this passage will enter at a greater velocity. Valve means are provided for controlling the ratio of communication of the passages during a given cycle of the engine operation. Positioning means are provided of positioning the valve means in response to the load on the engine so that substantially all of the idle and low load charge requirement of the engine are supplied by the auxiliary induction passage and substantially all of the high load requirements are supplied by the main induction passage. In connection with this feature of the invention, the positioning means is operative to provide a non-linear movement of the valve means during the transition of flow from the auxiliary to the main induction passage.

Another feature of this invention is adapted to be embodied in a throttle valve arrangement for controlling the induction of an internal combustion engine. In accordance with such a valve arrangement, a first butterfly-type throttle valve is supported for rotation about a first pivot axis and a second throttle valve is supported for rotation about a second pivot axis. In accordance with this feature of the invention, the first and second pivot axes are spaced from each other a distance less than the diameter of the throttle valves to provide a compact arrangement.

DETAILED DESCRIPTION OF THE PREFERRED EMBODIMENTS

Embodiments of FIGS. 1 through 6

Figure 1:
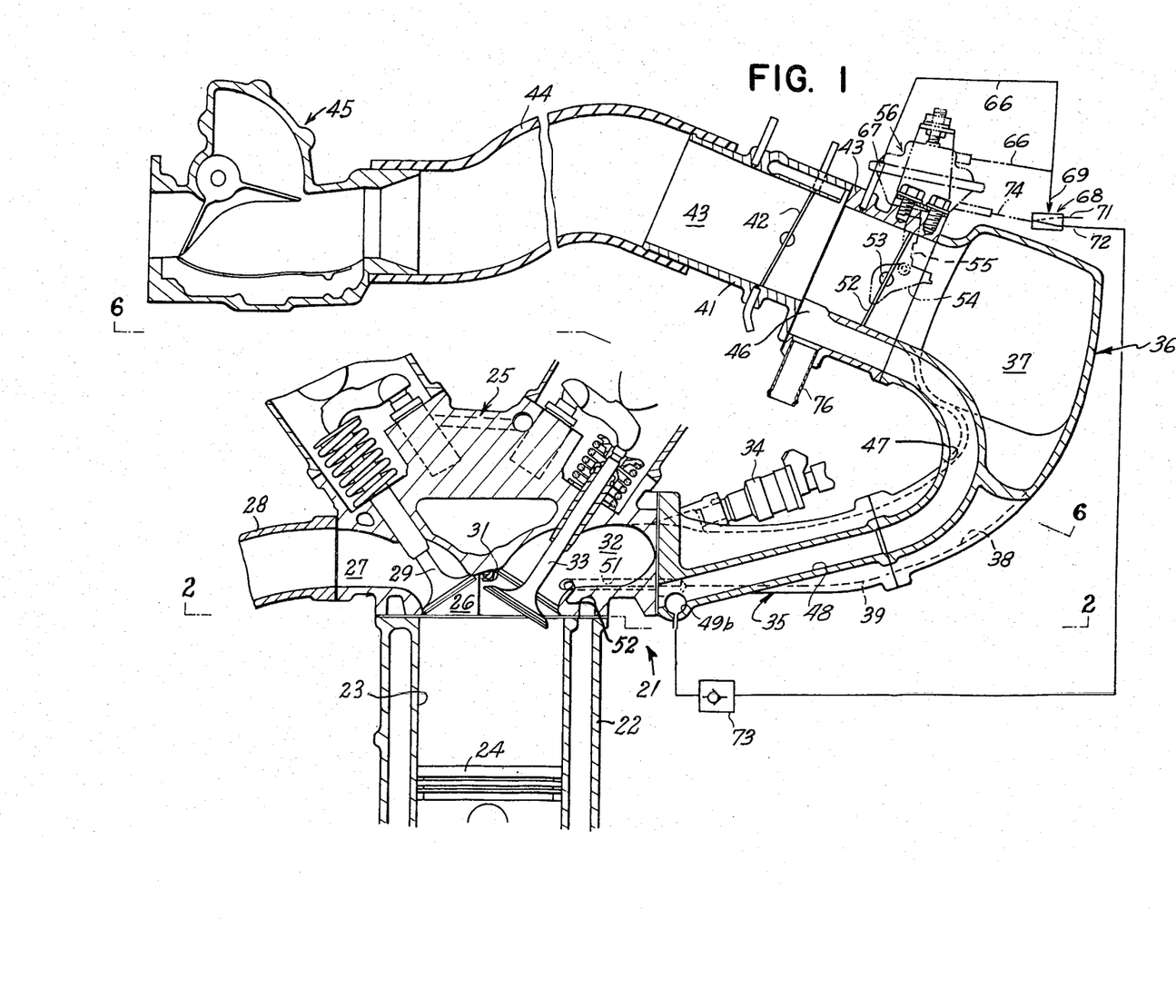
FIG. 1 is a schematic cross-sectional view taken through the single cylinder of a multi-cylinder engine constructed in accordance with a first embodiment of the engine.
Figure 2:
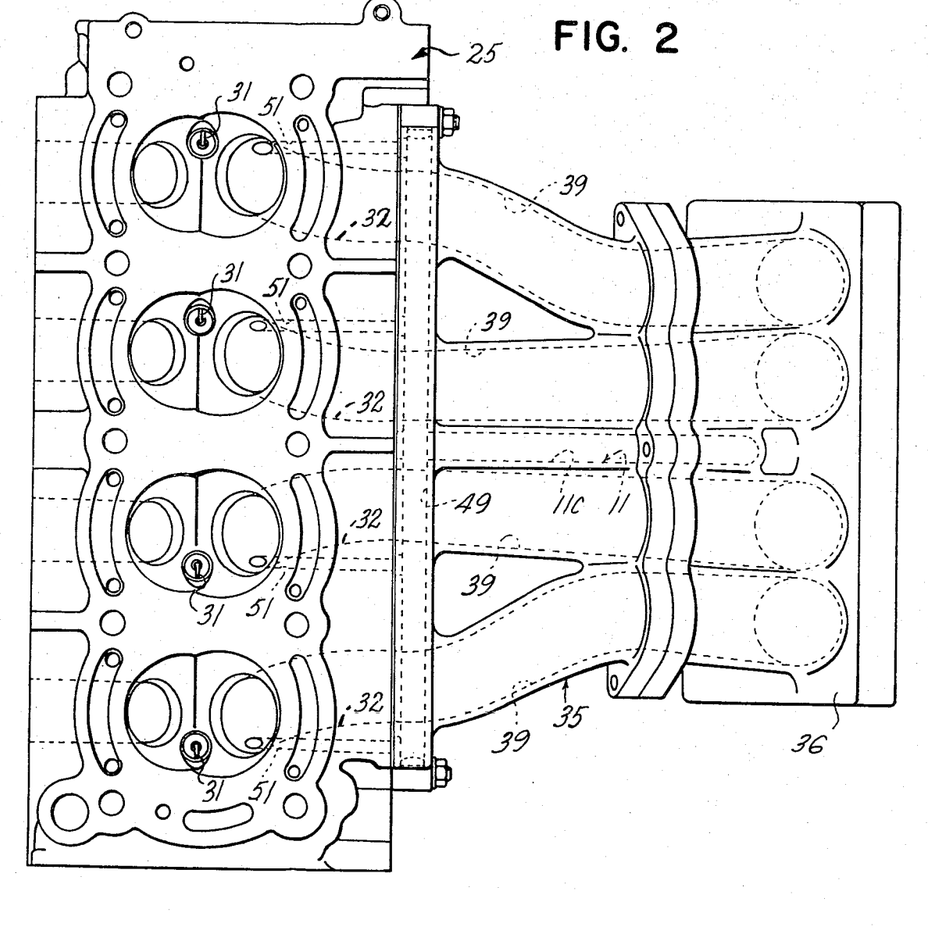
FIG. 2 is a bottom plan view of the cylinder head and induction system of the invention shown in FIG. 1 and is taken generally in the line of 2–11 in FIG. 1.

An internal combustion engine constructed in accordance with a first embodiment of the invention is identified generally by the reference numeral 21. The engine 21 includes a cylinder block 22 in which a plurality of cylinder bores 23 are provided. Pistons 24 are slidably supported in each of the cylinder bores 23 and drive a crank shaft through connecting rods (not shown) in a known manner. A cylinder head, indicated generally by the reference numeral 25, is affixed to the cylinder block 21 and has a plurality of chambers 26 that cooperate with the cylinder bores 23 and pistons 24 to provide chambers of variable volume in which combustion occurs.

Exhaust passages 27 extend from each of the chambers 26 to an exhaust manifold 28 for discharge of the combustion products. Exhaust valves 29 control the flow through the exhaust passages 27 in a known manner.

A spark plug 31 is positioned in each cylinder head chamber 26 for firing the charge in a known manner.

A main intake passage 32 is formed in the side of the cylinder head opposite the exhaust passages 27 for delivering a charge to each of the respective chambers 26. An intake valve 33, which is operated in a known manner, controls the communication of the main intake passages 32 with the chambers 26.

In this embodiment of the invention, the engine 21 is fuel injected and for this purpose, injection nozzles 34 are provided in an intake manifold, indicated generally by the reference numeral 35 and discharge directly into the respective cylinder head intake passages 32. The manifold 35 also includes a main inlet portion 36 in which a plenum 37 is formed. Runners 38 extend from the plenum 37 to individual inlet passages 39, each of which communicates with the cylinder head main intake passages 32. Upstream of the plenum 37, a throttle block 41 is provided in which an operator controlled throttle valve 42 is positioned. The throttle valve 42 controls the flow through an inlet passage 43 of the throttle block 41 which is in turn charged by a flexible pipe 44. The inlet end of the flexible pipe 44 communicates with an air flow detector 45, of a known type, which controls the amount of fuel discharged from the nozzles 34 in accordance with the total air flow through the system, as is well known.

The portion of the engine 21 thus far described is conventional and, for that reason, further details have not been given.

In accordance with this invention, an auxiliary or sub-intake system is also provided for delivering a charge to each of the chambers 26 under low and partial load conditions. This is done to substantially increase turbulence in the chambers at the time of combustion and thus accelerate the combustion process. This has been found to significantly increase efficiency, effect smoother combustion and improve emission characteristics.

The sub-intake system includes a main auxiliary inlet 46 positioned immediately downstream of the throttle valve 42. The inlet 46 feeds auxiliary inlet passages 47 and 48 formed in the manifold sections 36 and 35, respectively. At the point of juncture with the cylinder head 25, a transverse distribution passage 49 is formed. The passage 49 communicates with cylinder head auxiliary inlet passages 51, which terminate in auxiliary inlet ports 52 disposed adjacent the head of the inlet valve 33. The ports 52 have a substantially lesser cross-sectional area than the ports of the main inlet passages 32, so that a given mass flow of charge entering the chambers 26 through the ports 52 will flow at a significantly higher velocity. Thus, turbulence and flame propogation speed is improved in the combustion chambers 26.

The proportion of charge flowing through the main and auxiliary induction passages is controlled by a butterfly-type throttle valve 52 that is positioned in the manifold portion 36 upstream of the plenum 37. The valve 52 is rotatably supported on a pivot shaft 53, which has affixed to it a lever 54 that is connected by means of a link 55 to a throttle positioner 56.

Figure 3:
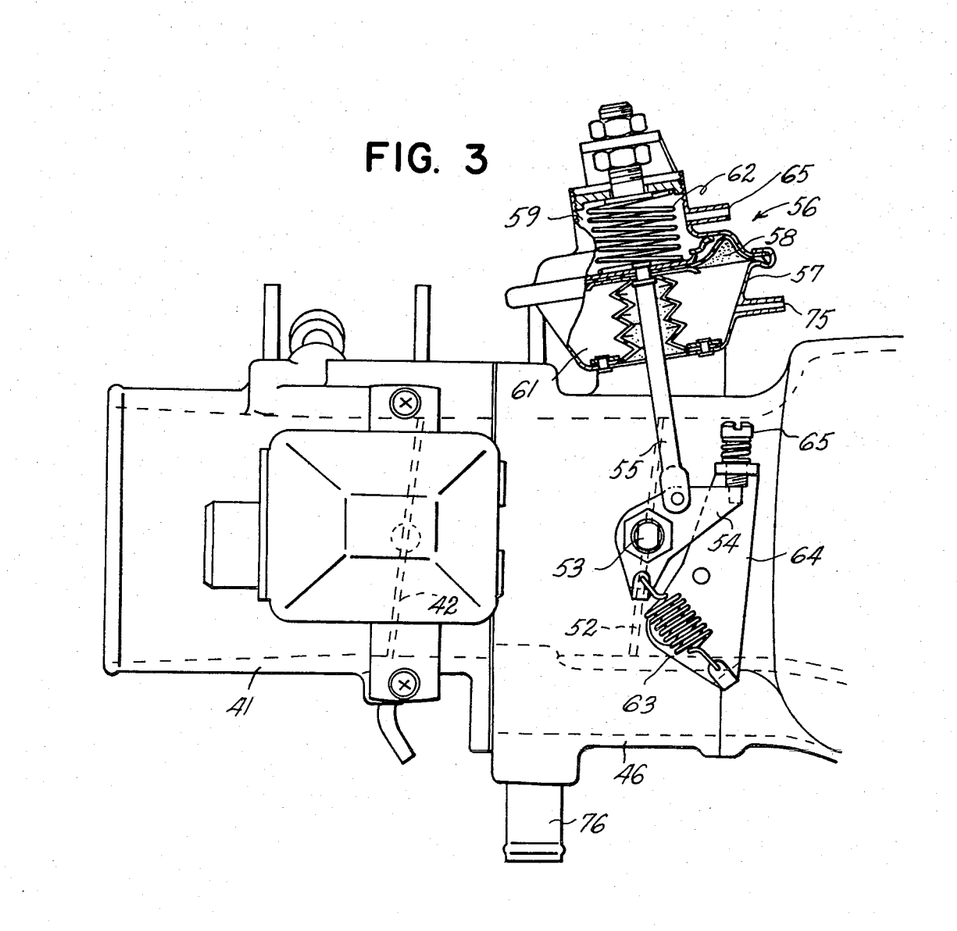
FIG. 3 is a side elevational view with portions broken away showing the detail of the throttle positioner of this embodiment.
Figures 4, 5:
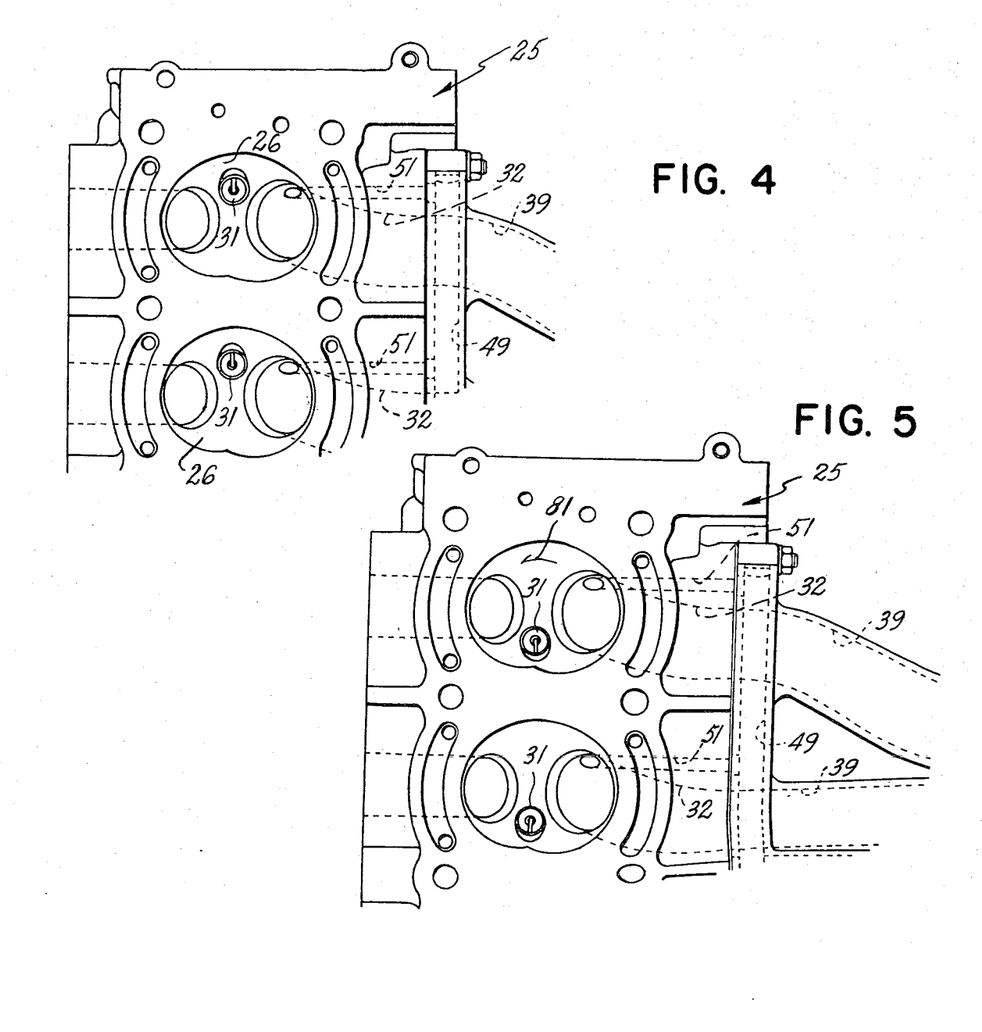
FIG. 4 is a fragmentary view of a portion of the invention shown in FIG. 2.
FIG. 5 is a fragmentary view of a portion of the invention in part similar to FIG. 4, showing another embodiment of the invention.
Figure 6:
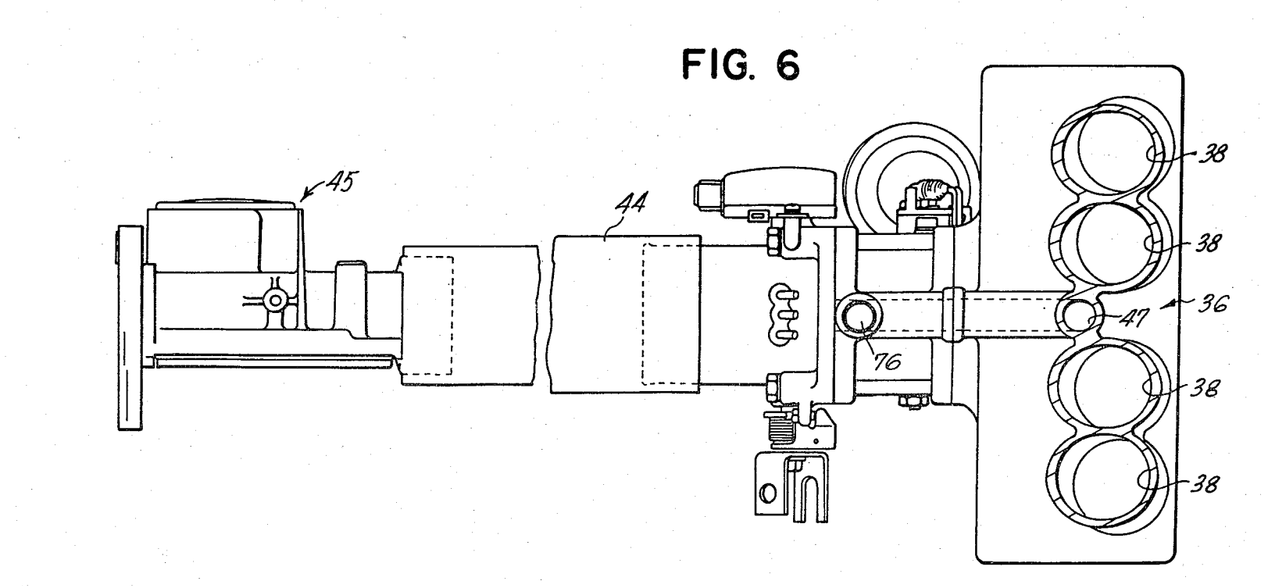
FIG. 6 is a cross-sectional view taken along the line 6—6 of FIG. 1.

The construction of the throttle positioner 56 may be best understood by reference to the cross-sectional view FIG. 3. The throttle positioner 56 includes an outer housing 57 in which a flexible diaphragm 58 is clamped to divide the housing into an upper chamber 59 and a lower chamber 61. A spring 62 is positioned within the chamber 59 for exerting a normally downward bias on the diaphragm 58 which normally tends to urge the control valve 52 toward its open position. A spring 63 is connected between the control valve lever 54 and a fixed abutment member 64 for urging a force on the control valve 52 normally tending to close it. The closed position of the throttle valve 52 is determined by an adjustable stop 65. The throttle positioner chamber 59 is provided with an inlet fitting 65 that is connected by means of conduit, indicated schematically at 66, to the portion of the induction system between the throttle valves 42 and 53 as shown in FIG. 1. A sensing port and associated pipe 67 provides this source of pressure. The conduit 66 also provides a control signal for a control valve, indicated schematically at 68, by means of a control port, indicated schematically at 69.

The control valve 68 selectively communicates the throttle positioner chamber 61 with either atmospheric pressure via an atmospheric port 71 or with induction system pressure via a conduit 72. The conduit 72 communicates with the auxiliary induction system distributor pipe 49 by means of a check valve 73. The control valve 68 communicates with the chamber 62 via a conduit, indicated schematically at 74 and an inlet nipple 75 (FIG. 3).

If desired, the engine 21 may employ an exhaust gas recirculation system. The output from the EGR valve (not shown) is delivered to the induction system by means of an inlet pipe 76 that intersects the portion of the induction system in which the control valve 52 is provided adjacent the auxiliary induction system inlet 46.

It has been noted, the control valve 68 is responsive to induction system pressure downstream of the throttle valve 42. When manifold vacuum is high (absolute pressure low) the valve 68 is held in a position so that the actuator chamber 61 experiences atmospheric pressure via the conduit 74 and atmospheric vent passage 71. When manifold vacuum is low (absolute pressure high) the valve 68 will be biased so that the conduit 74 communicates with induction system pressure via the conduit 72 and check valve 73.

When the engine 21 is running, both actual chambers 59 and 61 will experience atmospheric pressure and the spring 62 will force the throttle valve 52 to a fully open position against the bias of the spring 63. Immediately upon starting of the engine and reaching its idle condition, a relatively high vacuum will be experienced in the induction system downstream of the throttle valve 42. This causes the chamber 61 to be vented to the atmosphere via the valve 68 and conduit 71. A relative low pressure will be transmitted to the actuator chamber 59 through the conduit 66. Thus, the diaphragm 58 will be urged upwardly to the position shown in FIG. 3 and the control valve 52 will be moved to its closed position. Thus, the intake charge will be delivered to the chambers 26 through the auxiliary induction system consisting of the inlet 46, passages 47 and 48, distributive pipe 49 and cylinder head auxiliary intake passages 51. Due to the small cross-sectional area, the air charge will enter the chambers 26 at a relatively high velocity. It should be noted that the discharge spray from the injection nozzle 34 intersects the path of air flow so that moisture distribution and vaporization will be improved. Due to the relatively high velocity, turbulence generated in the chambers 26 causes rapid flame propagation at the time of combustion and improved efficiency as well as better control over the emission of unwanted exhaust gas constituents.

As the load on the engine is increased, the manually operated throttle valve 42 will be progressively opened and a reduction in the intake manifold vacuum will occur. Eventually the reduced pressure will be such that atmoshperic pressure in the chamber 61 is no longer sufficient to overcome the section of the spring 62 completely and the auxiliary throttle valve 52 will begin to open. In one embodiment of the invention, the springs 62 and 63 and the geometry of the linkage is such that the auxiliary throttle valve 52 is held in its closed position for intake manifold vacuums exceeding 450 mm Mercury. Opening of the auxiliary throttle valve 52 commences at this pressure and continues until intake manifold vacuum is less than about 130 mm Mercury.

At the aforementioned pressure (130 mm of Mercury in accordance with the described example) the pressure port 69 of the control valve 68 will no longer be sufficient to hold the conduit 74 in communication with the conduit 72. At this time, induction system pressure will be transmitted to the chamber 61 thus equalizing or nearly equalizing the pressure in the chambers 59 and 61. The spring 62 will, therefore, cause the auxiliary throttle valve 52 to suddenly open and substantially all of the engine charge requirements will be delivered to the chambers 26 through the main induction system.

By effecting rapid opening of the auxiliary throttle valve 52 at larger power outputs, volumetric effeciency and air flow is improved. If the throttle valve 52 were not open rapidly, it might have the effect of introducing unwanted turbulence in the air flow at higher engine speeds and loads.

In the embodiment shown in FIGS. 1–4, the shape of the combustion chamber 26 is basically the shape of a double hemisphere. As may be seen from FIG. 4, the spark plug 21 is located relative to the inlet passages so that the intake charge will pass across the spark plug immediately after induction. In some instances it may be desirable to heat the charge to insure better vaporization before firing. FIG. 5 illustrates a construction for accomplishing this result. As shown by the arrow 81 in this Figure, a swirl is imparted to the intake charge due to the orientation of the auxiliary intake passage 51 in a generally tangential relationship to the cylinder bore 23. In conjunction with this embodiment, the intake charge passes across the heated head of the exhaust valve 29 before it passes across the spark plug 31. Thus, vaporization of the fuel is further promoted prior to ignition.

Figure 7:
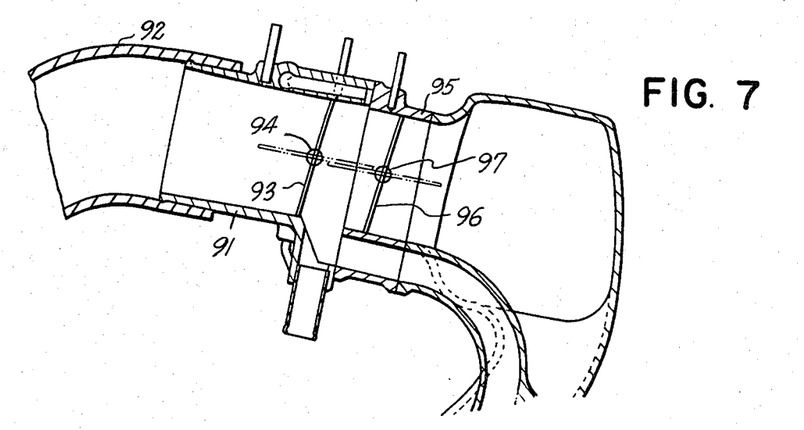
FIG. 7 is a partial cross-sectional veiw in part similar to FIG. 1, showing another embodiment of the invention to illustrate how a compact control valve arrangement may be achieved.

EMBODIMENT FOR FIG. 7

As was noted in discussing the embodiments of FIGS. 1–6, two control valves are embodied, both in substantially the same length of the inlet pipe. With previously proposed constructions, a considerable length of inlet pipe was necessary to accommodate both throttle valves. In accordance with this embodiment of the invention, an arrangement is provided where by both the main and auxiliary throttle valves may be positioned relatively closely to each other. Since this embodiment of the invention only relates to the construction and placement of the throttle valves, only this portion of the structure has been illustrated. It is to be understood that the illustrated throttle valve arrangement may be used in conjunction with the engine shown in FIGS. 1–5. Alternatively, other applications for this principle will present themselves to those skilled in the art.

In conjunction with this embodiment, a valve block 91 is provided downstream of an air inlet pipe 92. A manually operated throttle valve 93 is rotatably supported in the valve block 91 upon a pivot shaft 94. Downstream of the valve block 91, a second valve block 95 is positioned. An auxiliary throttle control valve 96 is rotatably supported in the valve block 95 upon a pivot shaft 97. The valve 96 is automatically controlled, in a manner as already described. The axis of the shafts 94 and 97 are offset slightly relative to each other. In this way both valves 93 and 96 may move to their fully opened position, as shown in the dot dash positions, without interference. Because of this offset relationship, the valves 93 and 96 may be positioned in close proximity to each other at a distance that need only be slightly greater than the radius of the larger of the two valves.

Figure 8:
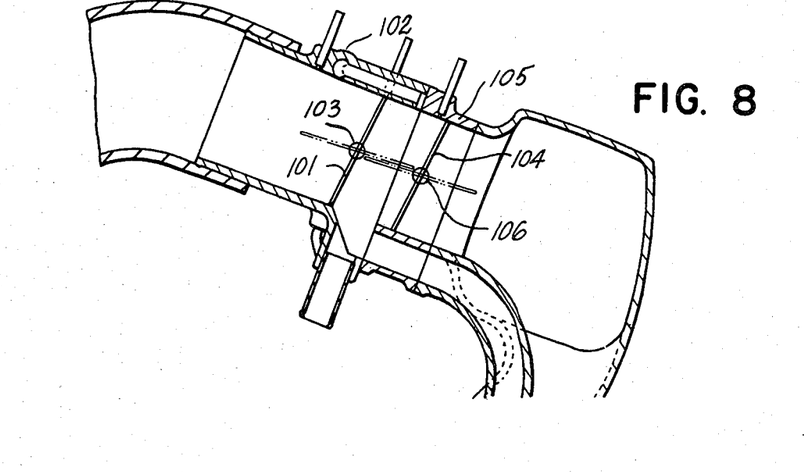
FIG. 8 is a partial cross-sectional view, in part similar to FIG. 7, showing another embodiment of the invention.

EMBODIMENT OF FIG. 8

FIG. 8 shows another embodiment of throttle valve arrangement similar in some regards to that of FIG. 7. In connection with this embodiment, however, the throttle valve shafts may be axially aligned with each other.

Referring now to this embodiment, a manually controlled throttle valve 101 is rotatably supported in a valve block 102 upon a pivot shaft 103. An automatically positioned auxiliary throttle valve 104 is rotatably supported in a valve block 105 upon a pivot shaft 106. The axes of the shafts 103 and 106 are axially aligned with each other. As will be noted from the dot dash line view, which shows the throttle valves 101 and 104 in their fully opened position, the valves 101 and 104 do not rotate through a full 90°. As a result of this, the valves 101 and 104 may be positioned with their shafts 103 and 104 quite close together and at a distance that can be even less than the radius of the larger of the two valves.

EMBODIMENT OF FIGS. 9–13

FIGS. 9–13 show another embodiment of the invention, generally similar to the embodiment of FIGS. 1–6. In connection with this embodiment, however, a slightly different type of throttle valve arrangement is embodied. In connection with this embodiment only the throttle valve arrangement will be described since in all other regards the embodiment is the same as the previously mentioned embodiment. For this reason, identical parts have been identified with the same references numerals and will not be described again.

Figures 9, 10:
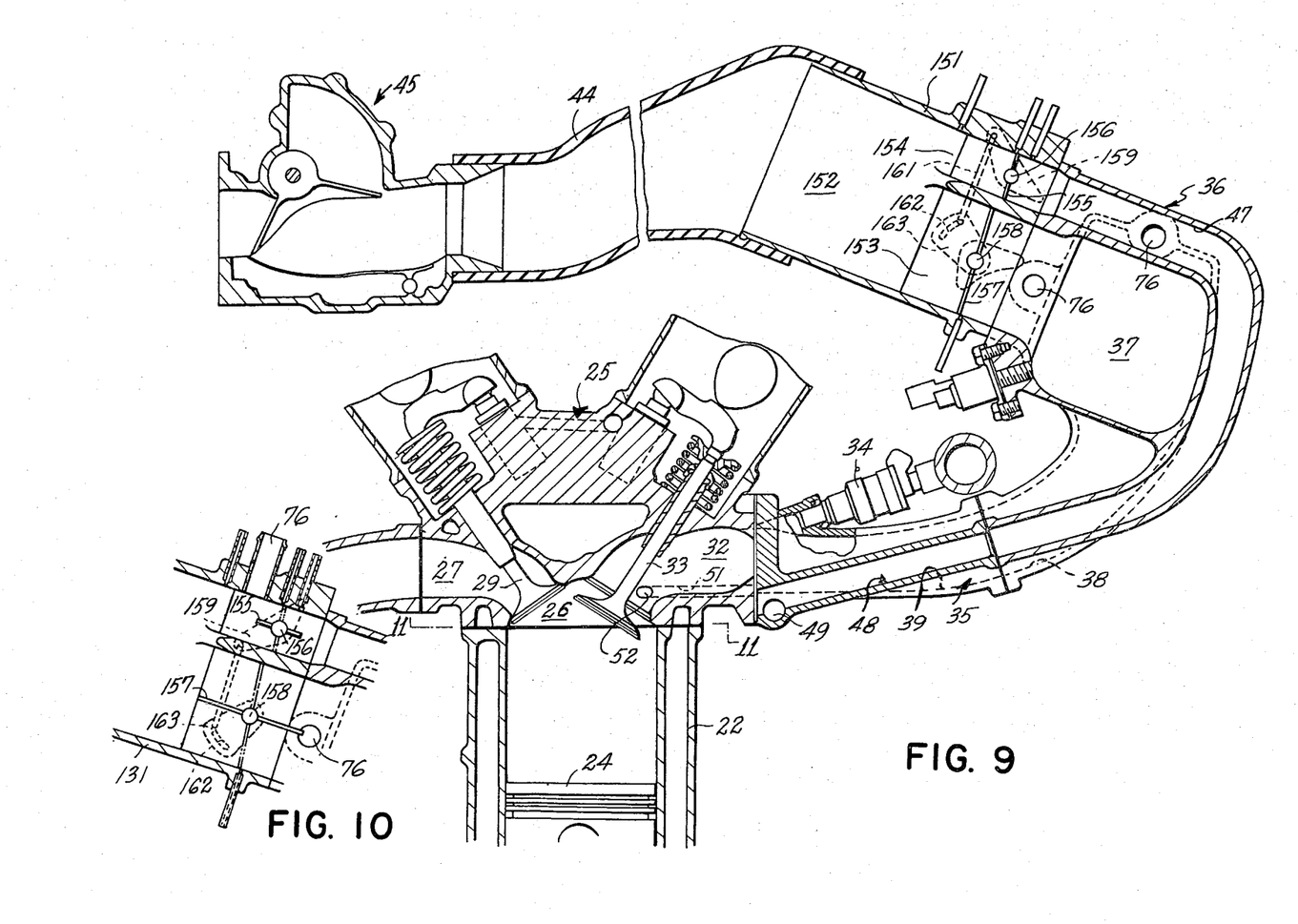
FIG. 9 is a cross-sectional view, in part similar to FIG. 1, showing a mechanical linkage system for limiting the throttle movement.
FIG. 10 is a partial cross-sectional view of the arrangement showing the linkage in another position.
Figure 11:
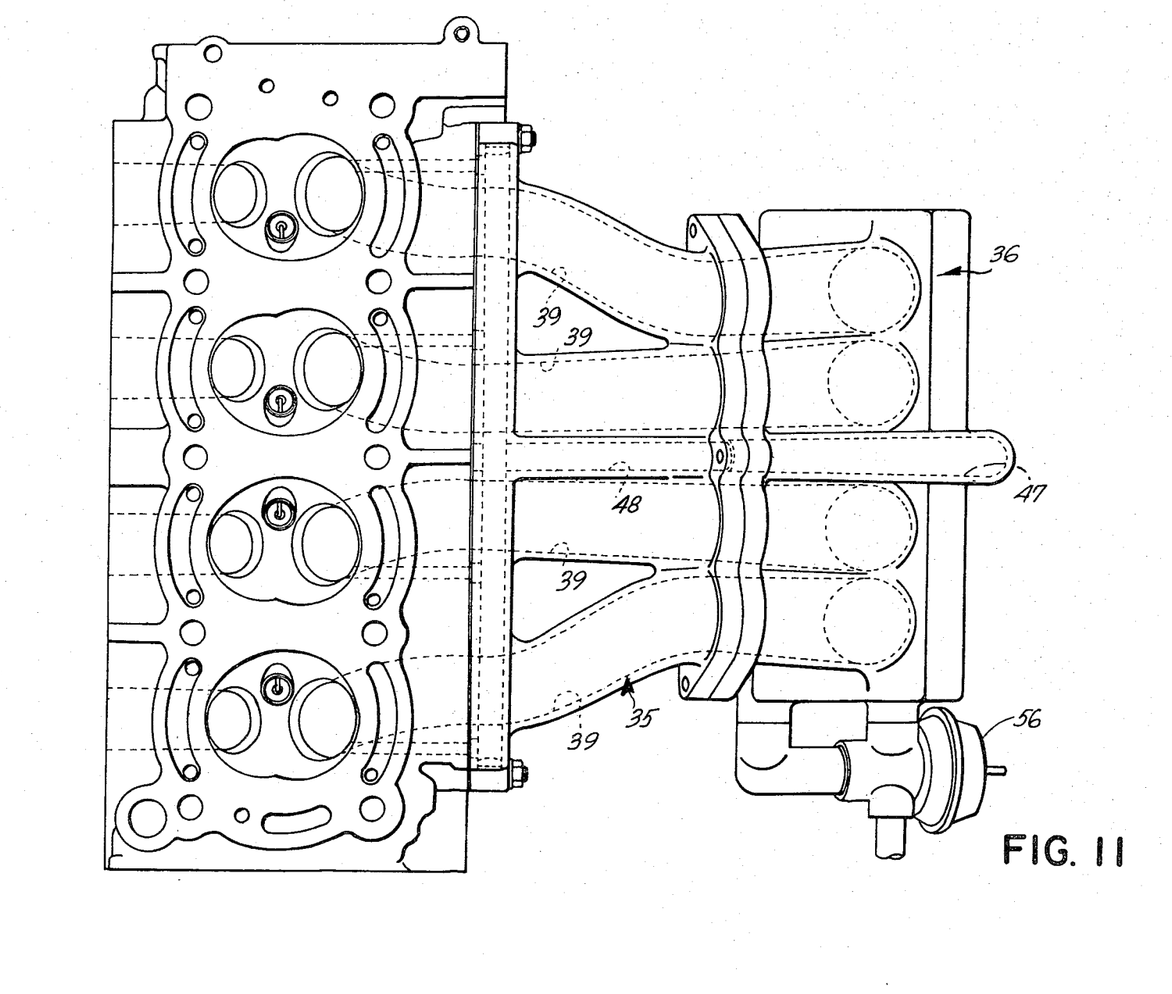
FIG. 11 is a bottom plan view of the cylinder head of the embodiment shown in FIG. 9, taken generally along the line of line 11—11 of FIG. 9.
Figure 12:
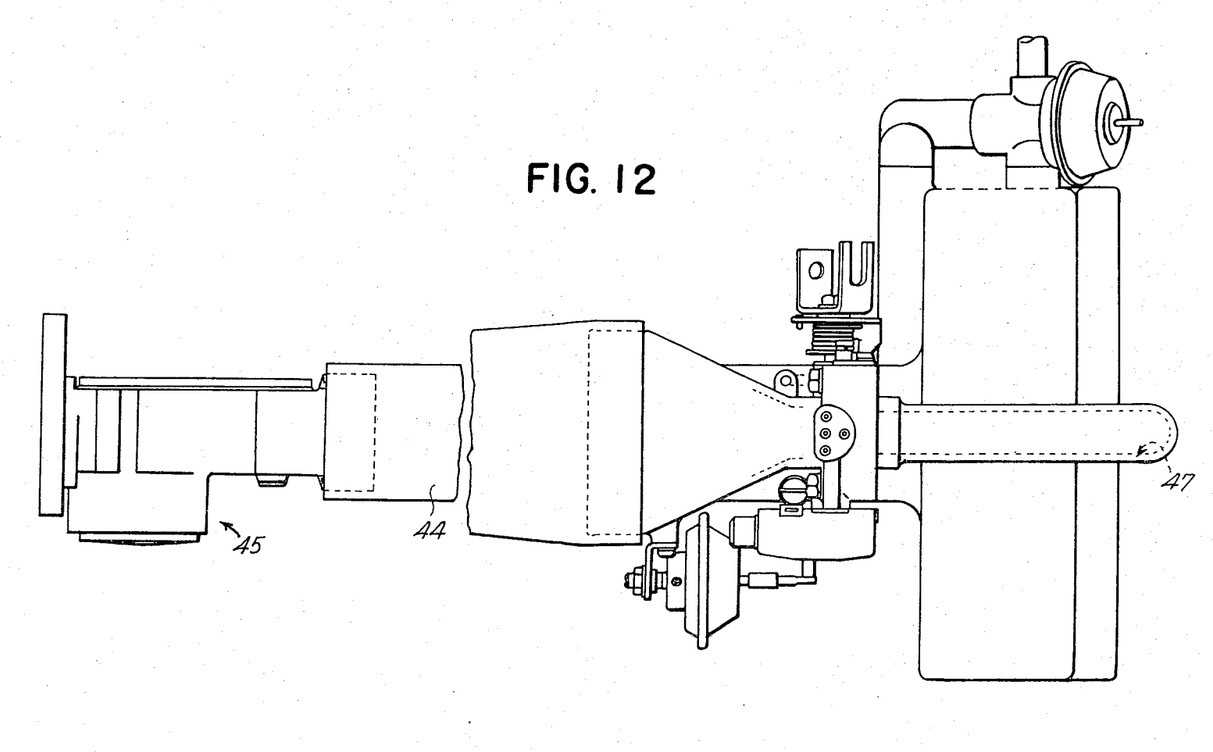
FIG. 12 is a top plan view of the embodiment of FIGS. 9-11.
Figure 13:
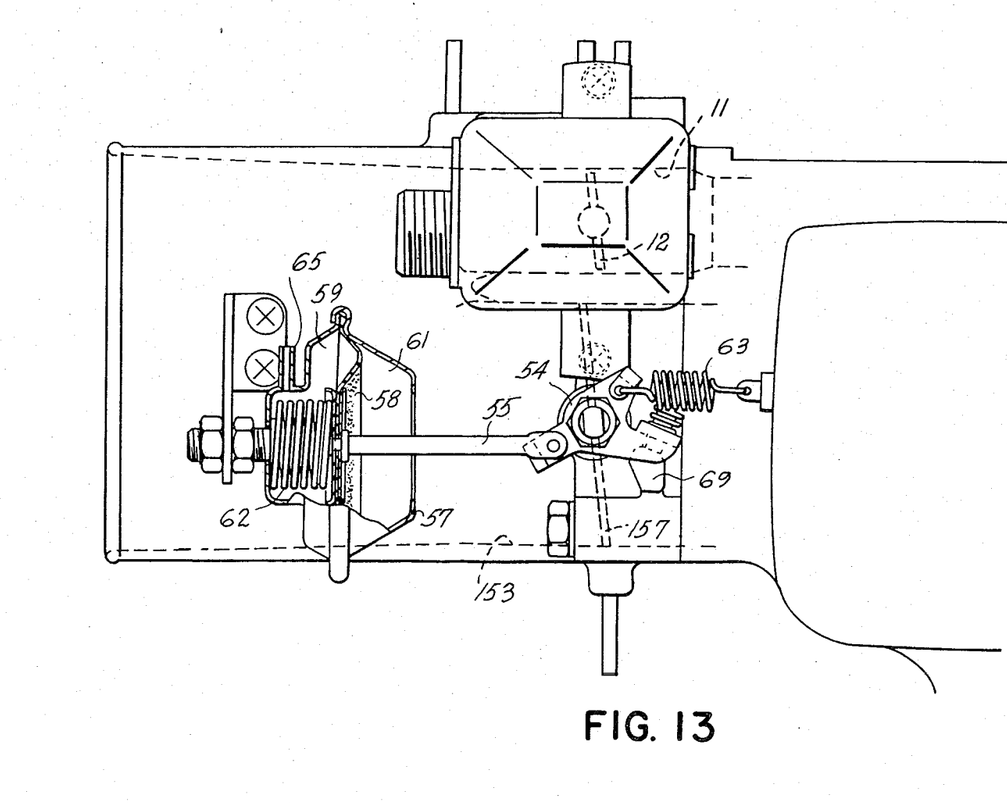
FIG. 13 is a side elevational view, portions shown in section, of the throttle positioner of the embodiment of FIGS. 9-12.

Referring primarily to FIGS. 9 and 10, a valve block 151 is positioned between the manifold 36 and the inlet pipe 44. The valve block 151 has a main inlet section 152 and a main valve bore 153 and an auxiliary bore valve 154. A manually positioned throttle valve 155 is positioned in the auxiliary bore 154 for controlling the flow through the auxiliary induction system passages 47 and 48. The valve 155 is affixed to a shaft 156 that is operated in any known manner so as to position the valve 155.

An auxiliary throttle control valve 157 is supported for rotation in the bore 153 upon a shaft 158. The auxiliary throttle valve 157 controls the air flow through the main induction system including the plenum 37 and runners 38. The auxiliary throttle valve 157 is controlled by an actuator as in the embodiment of FIGS. 1-6. If desired, however, the control valve 68 of the previously described embodiment may be eliminated so that the auxiliary throttle control valve 157 is positioned solely in response to induction system vacuum. Such an embodiment is illustrated.

Since both throttle valves 155 and 157 experience atmospheric pressure, a linkage structure is incorporated so as to preclude any opening of the auxiliary throttle valve 157 until the manually operated throttle valve 155 is opened to a predetermined degree. This linkage system includes a bell crank 159 that is affixed to the throttle valve shaft 156. A link 161 is pivotally connected to the arm of the bell crank 159 and has its opposite end extending into an elongated slot 162 of a lever 163 that is affixed to the throttle valve shaft 158. The length of the slot 162 forms a lost motion connection that limits the degree of movement possible for the valve 157 depending upon the position of the valve 155. Thus, the valve 157 can only open to a limited extent after the valve 155 is opened. Furthermore, if the valve 156 is suddenly closed the described linkage will cause immediate closure of the valve 157.

Figure 16:
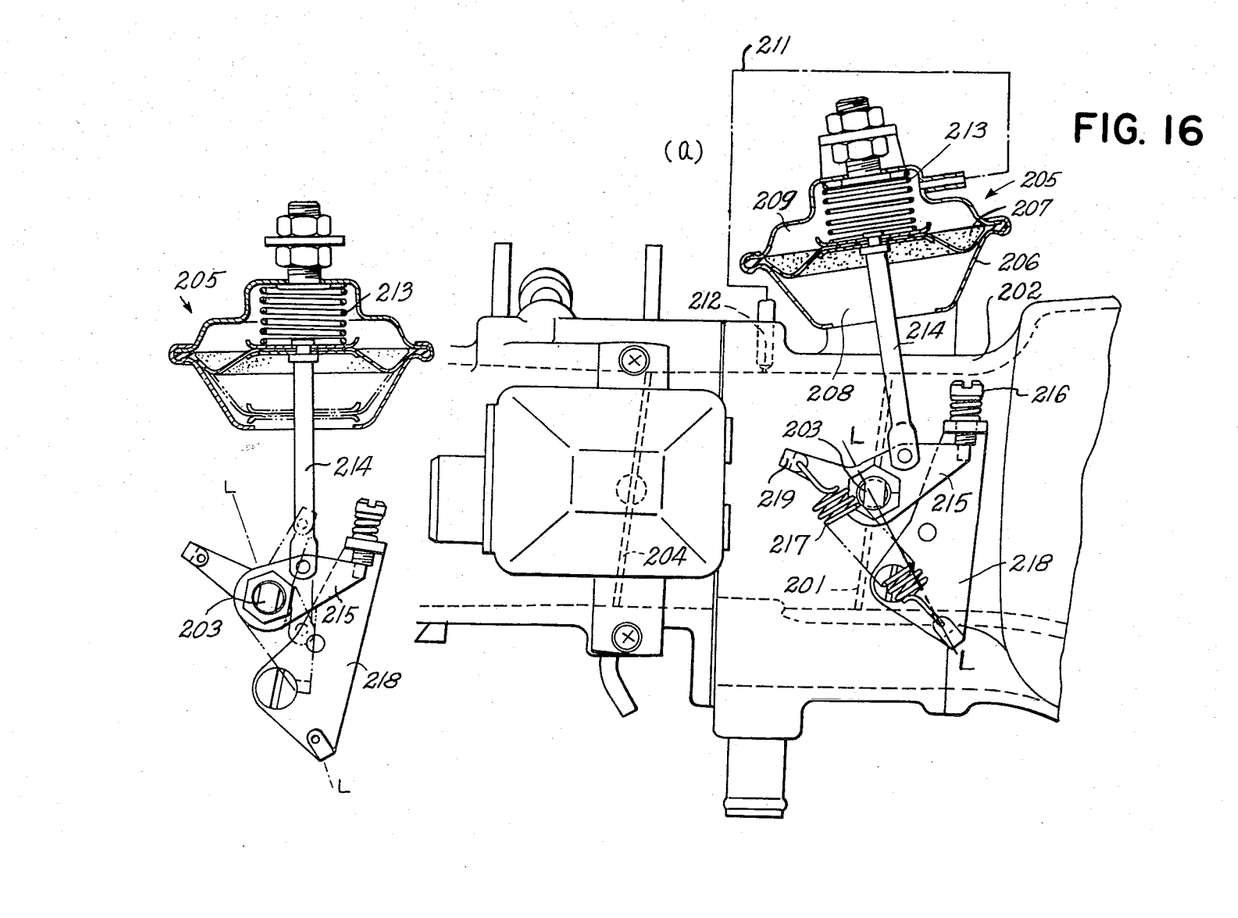
FIG. 16 is a side elevational view with portions shown in section, similar in part to FIG. 13 and showing a further embodiment of the invention.

EMBODIMENT OF FIG. 16

In connection with the embodiment of FIGS. 1-6 the rapid opening of the auxiliary throttle valve was achieved by controlling the pressures in the actuator for the valve. The rapid opening may also be accomplished through the use of an overcenter type of linkage arrangement, as will now be described.

Since this portion of the invention deals only with the actuator for the auxiliary throttle valve, only this portion of the structure has been illustrated in the drawings and will be described.

An auxiliary throttle valve 201 is positioned in a valve block 202 and supported for rotation upon a shaft 203. The valve block 202 is positioned downstream of the inlet in which a manually controlled throttle valve 204 is positioned.

An actuator, indicated generally by the reference number 205 is provided for controlling the position of the auxiliary throttle valve 201. The actuator 205 consists of an outer-housing 206 in which a diaphragm 207 is positioned. The diaphragm 207 devides the housing 206 into a lower chamber 208, which is open to the atmosphere, and an upper chamber 209 that is exposed to induction system pressure, as will be described. A conduit 211 interconnects the actuator chamber 209 with a port 212 formed in the valve block 202 by the throttle valves 201 and 204.

A spring 213 is positioned in the chamber 209 to apply a downward bias to the diaphragm 207. The diaphragm 207 is connected by means of a link 214 to a bell crank 215 that is fixed for rotation with the throttle shaft 203. The arm of the bell crank 215 engages an adjustable stop 216 to adjust the closed position of the throttle valve 201.

A tension spring 217 is connected between a fixed bracket 218 that carries the adjustable stop 216 and an arm 219 of the bell crank. As with the preceeding embodiments, the auxiliary throttle valve 201 is opened as intake manifold vacuum decreases, an indication of the load on the engine. During the initial opening of the throttle valve 201 the point of connection of the spring 217 with the bell crank arm 219 lies to the left of a line L—L passing through the center of the throttle valve shaft 203 from the anchored end of the spring 217. Thus, during this portion of the movement the spring 217 acts against the actuator spring 213 and resists opening of valve 201. When the arm 219 passes across the line L—L, as shown in the dot-line view of FIG. 17, the spring 217 will no longer resist opening of the valve 201 but will, in fact, act to assist in its opening. Thus, the rapid rate of opening will occur at this point achieving the same effect as the fluid pressure sources employed in the embodiment of FIGS. 1-6.

The geometry of the system is such that the overcenter point occurs at the desired point when rapid opening of the throttle valve 201 is deemed necessary. In accordance with the specific example mentioned in connection with FIGS. 1-6, this can be offset at the point when intake manifold vacuum falls to approximately 130 mm of Mercury.

THEORY

It has been noted that the fast opening of the auxiliary throttle valve at a certain point in the engine performs curve is desirable to improve operation. The use of the small auxiliary induction passage, as has been noted, significantly improves low speed performance. However, due to the use of the small passages significant flow restriction occurs at higher air flows and engine loads. Thus, it is important to rapidly open the auxiliary throttle valve once the transition point is reached. This is also important due to the restriction of flow provided through the main induction passage by the auxiliary throttle valve.

Figure 14:
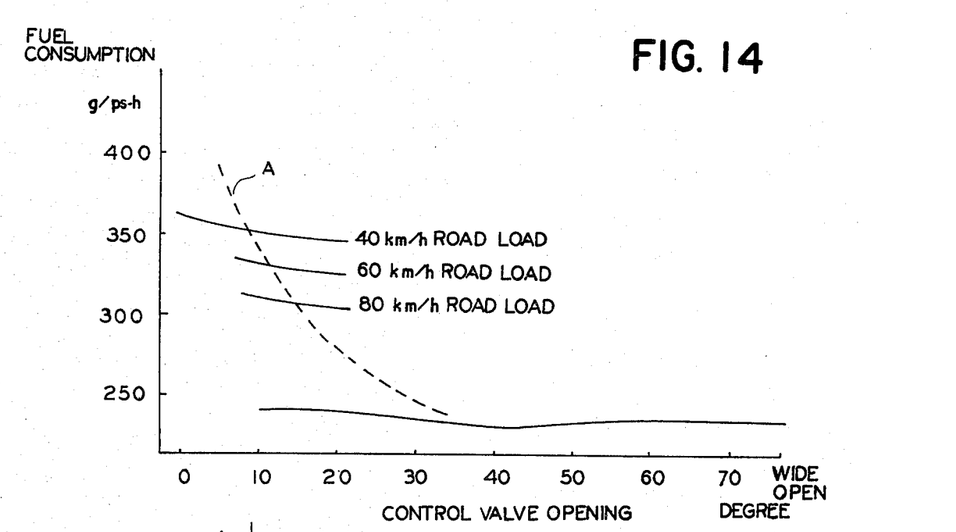
FIG. 14 is a graphical representation to explain certain features of this invention.
Figure 15:
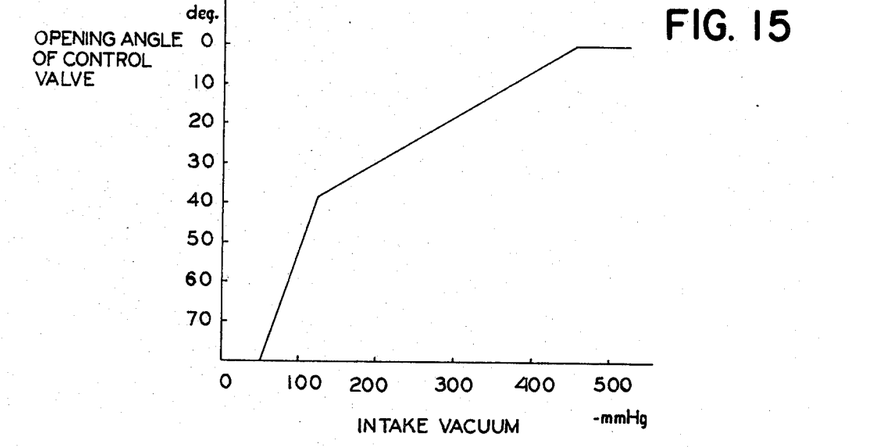
FIG. 15 is a graphical representation to explain certain other features of this invention.

The aforenoted effects may be best understood by the graphical analysis shown in FIGS. 14 and 15. In FIG. 14 the dotted line curve identified by the reference letter A represents the relationship between fuel consumption and auxiliary throttle valve degrees of opening at an optimum point of fuel consumption and stable combustion. Considering the condition at 40 kilometers per hour road load, if the auxiliary throttle valve is open less than about 9° the stability of combustion will deteriorate. If the valve is open more than 9°, on the other hand, the amount of turbulence will be decreased significantly and uneven combustion will result. From this curve it will be seen that once the auxiliary throttle valve is opened beyond about 35° it has substantially no effect on improving turbulence in the combustion chamber and combustion efficiency. However, the valve in this position will provide a resistance to the flow through the main induction passage and thus decrease volumetric efficiency. At this point, therefore, it is important to effect its rapid opening. FIG. 15 is a graphic analysis showing the movement of the auxiliary throttle valve in relation to intake manifold vacuum in accordance with the invention. It will be seen that at low vacuums up to about 450 mm of Mercury the auxiliary throttle valve is closed. When the manifold vacuum falls below 450 mm of Mercury the throttle valve is opened at a substantially linear rate until the manifold vacuum falls to about 130 mm of Mercury. At this time, the throttle valve which was opened at about 35° is rapidly moved to its fully opened position.

The invention has been described with certain embodiments all of which employed fuel injection systems. It is to be understood, however, that this invention is equally as susceptible of use with carbureted engines. Various other changes and modifications from those described may be made without departing from the spirit and scope of the invention, as defined by the appointed claims.

We claim:

1. In an internal combustion engine having a variable volume chamber in which combustion occurs and a main intake passage communicating with said chamber through a main intake port for delivering a charge thereto, an auxiliary intake passage communicating with said chamber through an auxiliary intake port, said auxiliary intake passage having an effective cross-sectional area substantially less than the effective cross-sectional area of said main intake passage for causing a given mass flow of charge through said auxiliary intake port to enter said chamber at a significantly greater velocity, valve means including at least one valve for controlling the ratio of the communication of said ports with said chamber during a given cycle of operation of said engine, and positioning means including an operator controlled element for positioning said valve means in response to the load on the engine for causing substantially all of the idle and partial load charge requirements of the engine to be supplied by said auxiliary intake passage and substantially all of the high load charge requirements by said main intake passage, the improvement comprising said positioning means providing linear movement of the one valve in response to movement of the operator controlled element from idle to off idle operation and non-linear movement of said one valve in response to movement of the operator controlled element during the transition of flow from said auxiliary intake passage to said main intake passage.

2. An internal combustion engine as set forth in claim 1 wherein the valve means include a manually operated valve and an automatically operated valve, the nonlinear means being interrelated with the automatically operated valve.

3. An internal combustion engine as set forth in claim 1 or 2 wherein the nonlinearity is achieved by varying the actuating force on the valve.

4. An internal combustion engine as set forth in claim 3 wherein the nonlinearity is achieved by a mechanical device.

5. An internal combustion engine as set forth in claim 4 wherein the mechanical device comprises an over center spring adapted to provide a bias against valve movement during only a certain range of movement of the automatically operated valve.

6. An internal combustion engine as set forth in claim 3 wherein the automatically operated valve is positioned by a fluid motor, the nonlinearity being achieved by altering the pressure transmitted to the fluid motor.

7. An internal combustion engine as set forth in claim 6 wherein the fluid motor includes at least one chamber exposed to induction system vacuum downstream of the throttle valve.

8. An internal combustion engine as set forth in claim 7 wherein the fluid motor further includes a second chamber acting in opposition to the first chamber, the variable force being achieved by selectively transmitting either induction system pressure or atmospheric pressure to said second chamber.

9. In an internal combustion engine having a variable volume chamber in which combustion occurs, a main intake passage communicating with said chamber, an auxiliary intake passage communicating with said chamber, said auxiliary intake passage having an effective cross-sectional area substantially less than the effective cross-sectional area of said main intake passage for causing a given mass flow of charge through said auxiliary intake passage to enter said chamber at a significantly greater velocity, said auxiliary intake passage having its inlet in communication with said main intake passage, a first valve in said main intake passage upstream of said auxiliary intake passage inlet, a second valve in said main intake passage downstream of said first valve and downstream of said auxiliary intake passage inlet for shunting air flow through said auxiliary intake passage when said second valve is closed, manually operable means for positioning said first valve, and means for positioning said second valve, said means for positioning said second valve being effective to provide non-linear movement of said second valve during a phase of its movement from a closed position to an open position in response to movement of said first valve during the transition of flow from said auxiliary intake passage to said main intake passage.

* * * * *